(12) United States Patent
Lothamer (10) Patent No.: US 8,579,239 B2
(45) Date of Patent: Nov. 12, 2013

(54) HARNESS SERVICE LOOP RETAINER

(75) Inventor: Michael P. Lothamer, Livonia, MI (US)

(73) Assignee: Yazaki North America, Inc., Canton, MI (US)

( * ) Notice: Subject to any disclaimer, the term of this patent is extended or adjusted under 35 U.S.C. 154(b) by 188 days.

(21) Appl. No.: 13/331,080

(22) Filed: Dec. 20, 2011

(65) Prior Publication Data

US 2013/0153716 A1    Jun. 20, 2013

(51) Int. Cl.
*F16L 3/22* (2006.01)

(52) U.S. Cl.
USPC ............. 248/69; 248/68.1; 248/74.3; 24/16 R (58) Field of Classification Search
USPC ............. 248/49, 65, 68.1, 69, 73, 74.1, 74.2, 248/74.3; 24/16 PB, 16 R
See application file for complete search history.

(56) References Cited

U.S. PATENT DOCUMENTS

| | | | | |
|---|---|---|---|---|
| 1,365,616 A | * | 1/1921 | Karitzky | 248/69 |
| 1,381,232 A | * | 6/1921 | Pleister | 248/69 |
| 1,763,770 A | * | 6/1930 | Fish et al. | 248/69 |
| 2,512,982 A | * | 6/1950 | Tinnerman | 24/16 R |
| 2,632,217 A | * | 3/1953 | Flora | 24/16 PB |
| 3,494,071 A | * | 2/1970 | Simmon | 47/44 |
| 3,894,706 A | | 7/1975 | Mizusawa | |
| 4,572,466 A | | 2/1986 | Yamaguchi et al. | |
| 4,795,116 A | | 1/1989 | Kohut et al. | |
| 4,817,897 A | * | 4/1989 | Kreusel | 248/68.1 |
| 4,993,669 A | | 2/1991 | Dyer | |
| 5,131,613 A | | 7/1992 | Kamiya et al. | |
| 5,367,750 A | | 11/1994 | Ward | |
| 5,538,208 A | * | 7/1996 | Cordes et al. | 248/69 |
| 5,673,878 A | * | 10/1997 | Yamate et al. | 248/65 |
| 5,730,399 A | * | 3/1998 | Baginski | 248/58 |
| 5,820,083 A | * | 10/1998 | Geiger | 248/74.3 |
| 5,921,510 A | | 7/1999 | Benoit et al. | |
| 5,941,483 A | | 8/1999 | Baginski | |
| 6,240,602 B1 | | 6/2001 | Geiger | |
| 6,330,989 B1 | * | 12/2001 | Okamoto | 248/74.1 |
| 6,364,257 B1 | * | 4/2002 | Holder | 248/74.3 |
| 6,431,502 B1 | * | 8/2002 | Goodman | 248/74.1 |
| 6,443,403 B1 | * | 9/2002 | Page et al. | 248/71 |
| 6,446,474 B1 | * | 9/2002 | Tabacchi et al. | 70/16 |

(Continued)

*Primary Examiner* — Bradley Duckworth
(74) *Attorney, Agent, or Firm* — Harness, Dickey & Pierce, P.L.C.

(57) ABSTRACT

A wire harness retainer assembly can generally include a strap member and a loop retainer. A housing portion can comprise a housing body that defines a receiving portion and a pair of apertures formed therethrough. The loop retainer can have a distal insertion end and form a loop that is configured to loop around a portion of the wire harness. The loop retainer can further comprise a pair of detents. The loop retainer can be configured to be slidably inserted into the receiving portion of the housing portion to an installed position where the detents are received by the pair of apertures. In this regard, the wire harness retainer assembly provides a simple and convenient way to capture the extra length of a wire harness service loop while providing an easily removable connection when service to a specified control module is desired.

22 Claims, 5 Drawing Sheets

(56) References Cited

U.S. PATENT DOCUMENTS

| | | |
|---|---|---|
| 6,641,093 B2 | 11/2003 | Coudrais |
| 6,718,597 B2 | 4/2004 | Geiger |
| 7,284,399 B1 * | 10/2007 | Sisco ................................. 70/16 |
| 7,614,593 B2 * | 11/2009 | McClure et al. ......... 248/229.14 |
| 7,762,503 B2 * | 7/2010 | Franks ............................ 248/71 |
| 7,774,905 B2 | 8/2010 | Geiger |
| 7,793,895 B2 | 9/2010 | Franks |
| 7,997,542 B2 | 8/2011 | Morello |
| 2002/0071715 A1 | 6/2002 | Geiger |
| 2010/0019104 A1 * | 1/2010 | Ichimura et al. ................. 248/49 |

* cited by examiner

HARNESS SERVICE LOOP RETAINER

FIELD

The present disclosure relates generally to wire harness retainers and more specifically to a wire harness retainer assembly configured to selectively retain a wire harness service loop of a body control module in a vehicle.

BACKGROUND

This section provides background information related to the present disclosure which is not necessarily prior art.

Motor vehicles typically include various wire harnesses that connect between various electrical components. In some configurations, wire harnesses may include removable electrical connectors such as those that connect to various vehicle control modules. Sometimes it is necessary to service these control modules such as a body control module. Often times however, the body control module may be mounted in a vehicle at a location that is generally inconvenient or difficult to access. In this regard, some vehicles incorporate body control modules in an area generally under a vehicle dashboard that can be difficult to view and service. In these situations, some body control modules incorporate wire harnesses that have extra slack such that the body control module or a portion thereof can be removed from its original mounting position and relocated to a more comfortable location on the vehicle. While the extra slack provided on the wire harness provides a service technician the necessary length to move the body control module to a more comfortable service location, the extra slack of the wire harness must be secured away from potential contact with a vehicle operator when the body control module is in the operational mounted position.

SUMMARY

This section provides a general summary of the disclosure, and is not a comprehensive disclosure of its full scope or all of its features.

A wire harness retainer assembly can generally include a strap member and a loop retainer. The strap member can have an insertion portion, a housing portion, and a lock portion. The insertion portion can be configured to be inserted into the lock portion and form a loop. The housing portion can comprise a housing body that defines a receiving portion and a pair of apertures formed therethrough. The loop retainer can have a body including a distal insertion end and a proximal receiving end. The body can form a first loop that is configured to loop around a first portion of the wire harness. The body can further comprise a pair of detents formed at the distal insertion end. The distal insertion end of the loop retainer can be configured to be slidably inserted into the receiving portion of the housing portion to an installed position where the detents are received by the pair of apertures.

According to additional features, the body of the loop retainer forms a second loop that is distinct from the first loop. The second loop can be configured to loop around a second portion of the wire harness. According to one example, the loop retainer body is unitary. The housing body can comprise a first pair of opposing walls and a second pair of opposing walls alternately formed with the first pair of opposing walls. The first pair of opposing walls can define a pair of corresponding relief portions thereon. The relief portions can accommodate portions of the body of the loop retainer in the installed position.

According to additional features, the wire harness retainer assembly can further comprise a pin that is configured to engage the loop retainer. The pin can inhibit the loop retainer from withdrawing from the receiving portion of the housing portion in a locked position. The housing body can define an opening for receiving a first portion of the pin. The body of the loop retainer can define a pair of opposing indents configured to collectively receive a second portion of the pin. The pin can inhibit the detents from moving toward each other in the locked position.

A method of securing a wire harness according to the present disclosure can include securing a strap member relative to a component of a control module. A first portion of the wire harness can be located into a first loop portion of a loop retainer. A second portion of the wire harness can be located into a second loop portion of the loop retainer. The second loop portion is distinct from the first loop portion. A distal insertion end of the loop retainer can be inserted into a housing formed on the strap member. The distal insertion end can be further inserted until a pair of detents extending from the loop retainer locates into corresponding apertures defined in the housing in an installed position. A pin can be advanced into an opening defined in the housing. The pin can be further advanced to a locked position between corresponding first and second ends of the loop retainer wherein the detents are inhibited from moving toward each other.

According to additional features, the pin is slidably located into corresponding indents formed on the first and second ends of the loop retainer. Portions of the loop retainer can be located through corresponding relief portions formed into the housing. According to additional features, the pin can be removed from the housing. The distal insertion end of the loop retainer can be subsequently withdrawn from the housing. The wire harness can be freed from the loop retainer. The body control module can be moved from a working position to a service position. The body control module can then be serviced. Subsequent to servicing the body control module, the body control module can be returned to the working position. The loop retainer can be located back to the installed position. The pin can be advanced back to the locked position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

At the outset, the following discussion will be directed toward retaining a wire harness that is configured for use with a body control module of a vehicle. It will be appreciated however, that the wire harness retainer assembly as set forth in this disclosure may be used for retaining other wire harnesses and those that may be associated with other control modules and electrical devices.

Figure 1:
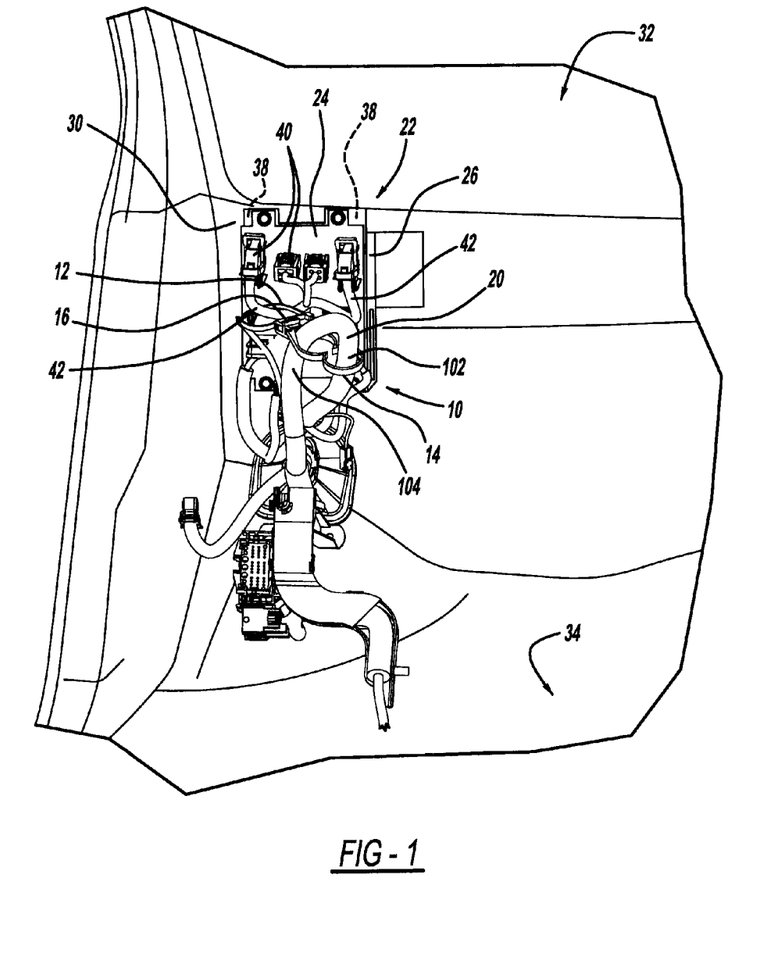
FIG. 1 is a front perspective view of a wire harness retainer assembly constructed in accordance to one example of the present disclosure and shown in an installed position with a wire harness service loop extending through a first and second loop portion of the loop retainer and shown with a body control module in an operating position.

With initial reference to FIG. 1, a wire harness retainer assembly constructed in accordance to one example of the present teachings is shown and generally identified at reference numeral 10. The wire harness retainer assembly generally comprises a strap member 12, a loop retainer 14, and a pin 16. The wire harness retainer assembly 10 is illustrated in FIG. 1 in an assembled and installed position relative to a wire harness service loop 20 and a body control module 22. More specifically, the wire harness retainer assembly 10 can generally locate around the wire harness service loop 20 at two distinct locations for maintaining the wire harness service loop 20 in a captured location adjacent the body control module 22.

Prior to describing the specific features of the wire harness retainer assembly 10, a general discussion of the body control module 22 and surrounding environment will be described. The body control module 22 can generally include a body control module panel 24 that releasably connects with a body control module base 26. The body control module 22 can be generally releasably mounted to a body panel 30 of a vehicle 32. In the example shown, the body panel 30 can be generally located under a dash panel (not specifically shown) and above a foot well 34. The body control module base 26 comprises a plurality of receptacles 38 for receiving a corresponding plurality of terminal connectors 40. Each of the terminal connectors 40 are connected to individual wire harnesses 42. The individual wire harnesses 42 can be collectively routed through the wire harness service loop 20.

Figure 2:
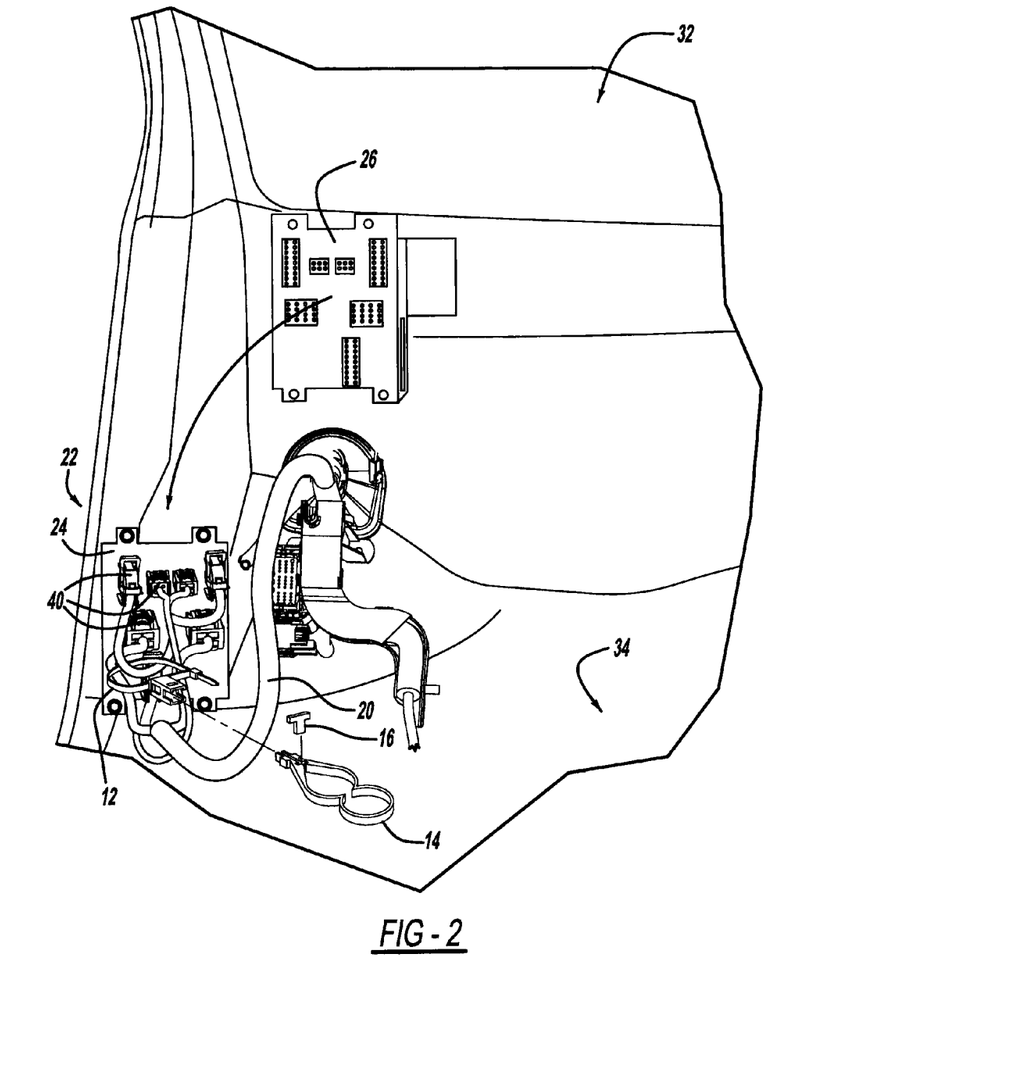
FIG. 2 is a front perspective view of the wire harness retainer assembly shown in an unassembled position and the body control module moved to a service location.

Turning now to FIG. 2, the body control module 22 is shown in a service location. In the example shown, the body control module panel 24 has been electrically disconnected from the body control module base 26. In it appreciated however, that the body control module panel 24 and the body control module base 26 can form one unit that is collectively moved from the body panel 30 of the vehicle 32 for servicing. Nevertheless, as shown, the wire harness service loop 20 in FIG. 2 provides a service technician necessary slack to service the body control module 22. In this regard, the service technician can more easily view, replace and/or manipulate the terminal connectors and other components of the body control module 24. Of note, the wire harness retainer assembly 10 is shown in an unassembled position to free the service loop 20 from the generally captured position of FIG. 1.

Figure 3:
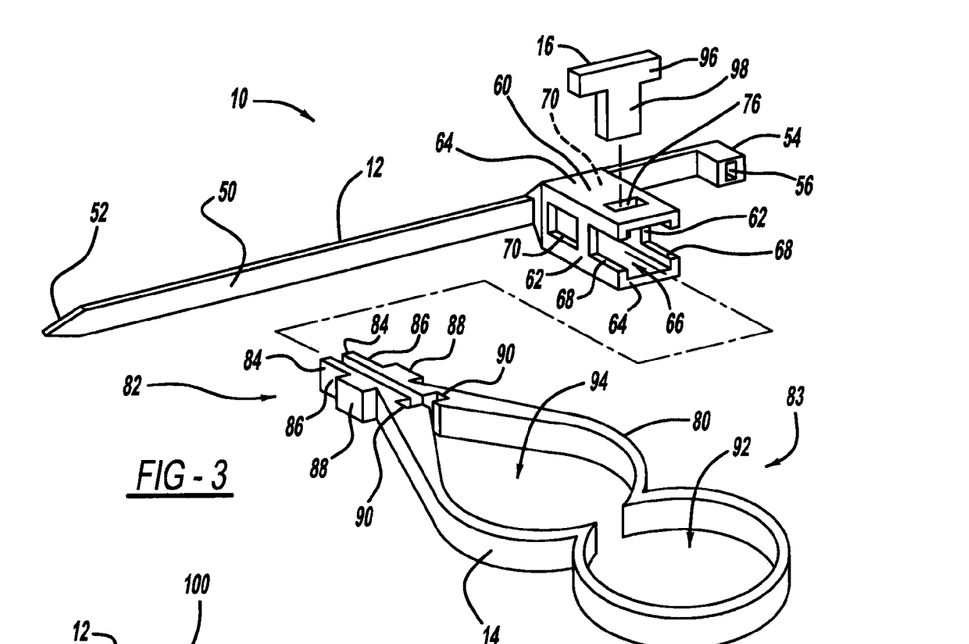
FIG. 3 is an exploded perspective view of the wire harness retainer assembly including the loop retainer, a strap member and a pin according to one example of the present disclosure.
Figure 4:
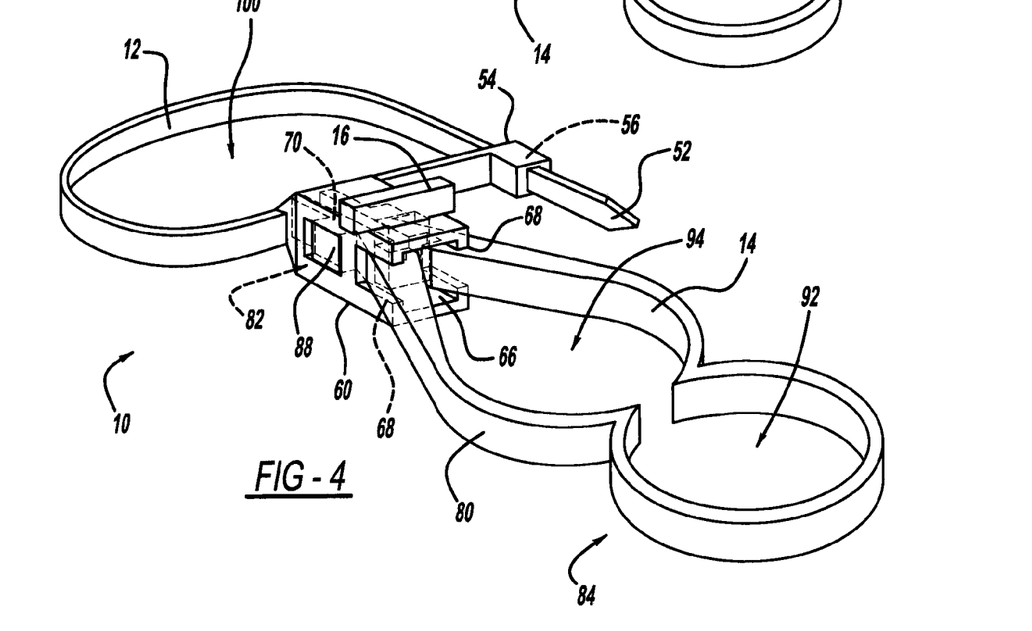
FIG. 4 is a front perspective view of the wire harness retainer assembly shown in an assembled position.

With particular reference now to FIGS. 3 and 4, the wire harness retainer assembly 10 will be described in greater detail. The strap member 12 can generally comprise an elongated strap body 50 that extends between an insertion portion 52 and a lock portion 54. The lock portion 54 can generally define a lock passage 56 that is configured to slidably receive the insertion portion 52 therethrough. Cooperating structure on the insertion portion 52 and the lock portion 54 can cause the strap body 50 to be selectively and progressively retained in the lock passage as the insertion portion 52 is advanced through the lock passage 56. The strap member 12 can further include a housing portion 60 thereon. The housing portion 60 can generally include a first pair of opposing walls 62 and a second pair of opposing walls 64. The first and second pairs of walls 62 and 64 can collectively define a receiving portion 66. The first walls 62 can define corresponding reliefs 68 thereon. The first walls 62 can further define apertures 70 therethrough. One of the second pair of walls 64 can define an opening 76 therethrough. The strap member can be formed of rigid plastic.

The loop retainer 14 can generally include a unitary body 80 having a distal insertion end 82 and a proximal retaining end 83. The loop retainer 14 can be formed of rigid plastic. The distal insertion end 82 can be collectively formed by terminal ends 84 of the body 80. The terminal ends 84 can generally include corresponding tabs 86 and detents 88 thereon. The body 80 can define opposing indents 90 formed therein. The body 80 can generally define a first loop portion 92 and a second loop portion 94. The first loop portion 92 can be configured to receive a first portion of the wire harness service loop 20 (FIG. 1) while the second loop portion 94 can be configured to receive a second portion of the wire harness service loop 20 in the assembled position. The pin 16 can generally include a gripping portion 96 and an insertion portion 98. The loop retainer 14 and the pin 16 can both be made of rigid plastic material.

With reference now to FIG. 4, the wire harness retainer assembly 10 is shown in an assembled position. In the assembled position, the insertion portion 52 of the strap body 50 of the strap member 12 is inserted through the lock passage 56 of the lock portion 54 to form a loop 100. The distal insertion end 82 is advanced into the receiving portion 66 of the housing portion 60 such that the respective detents 88 are received into the respective apertures 70 in an installed position. Notably, in the installed position, the body 80 of the loop retainer 14 is accommodated through the respective reliefs 68.

Figure 5:
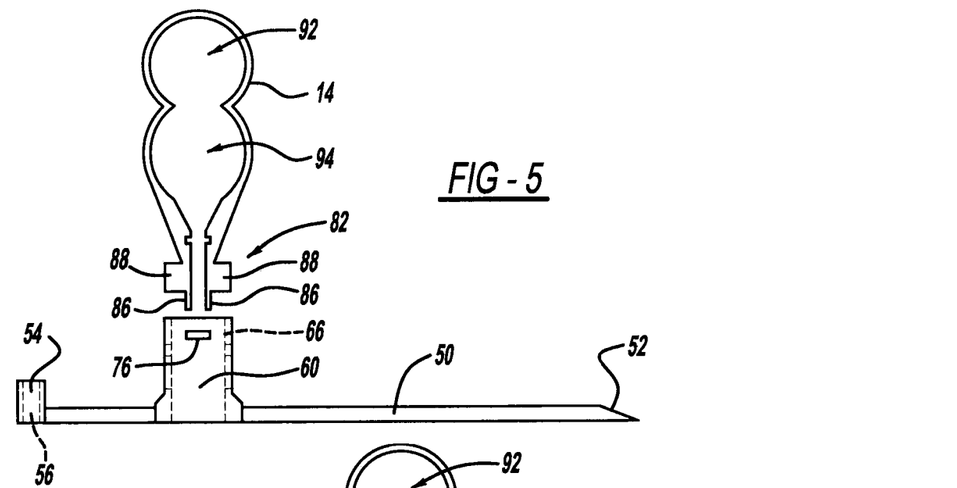
FIG. 5 is a side view of the loop retainer and strap member shown with the loop retainer in an uninstalled position relative to the strap member.
Figure 6:
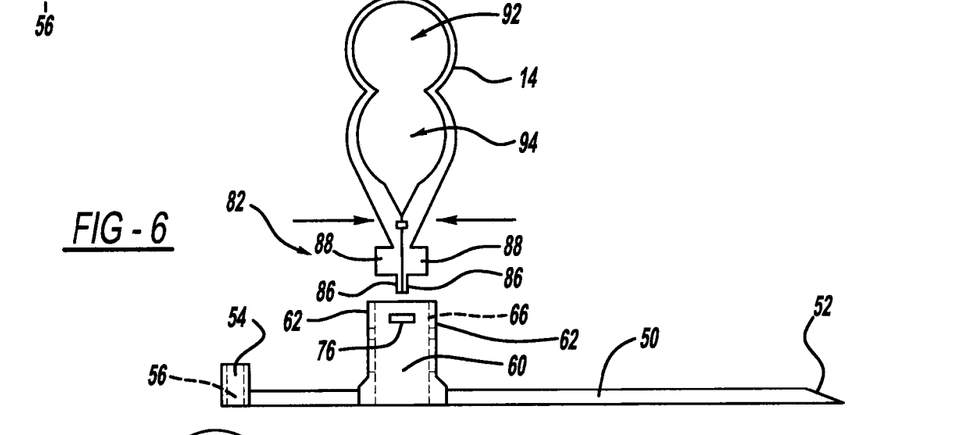
FIG. 6 is a side view of the loop retainer and strap member of FIG. 5 and shown with a distal insertion end of the loop retainer pinched for insertion into a housing of the strap member.
Figure 7:
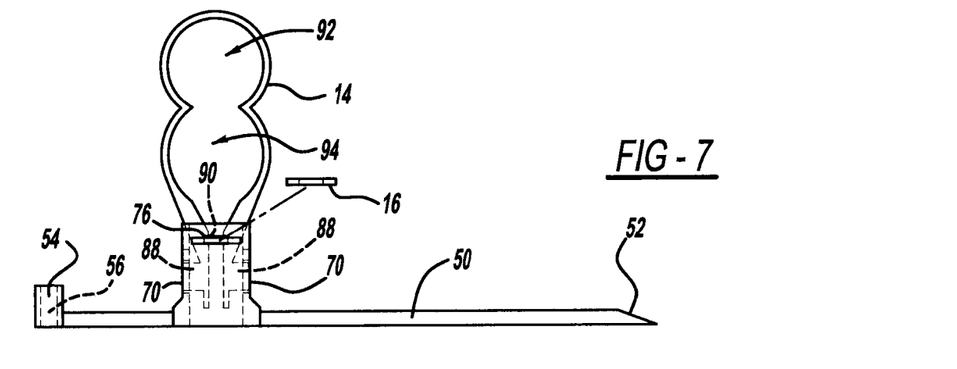
FIG. 7 is a side view of the loop retainer and strap member shown with the distal insertion end of the loop retainer inserted into the housing and with the pin ready for insertion into an opening of the housing.
Figure 8:
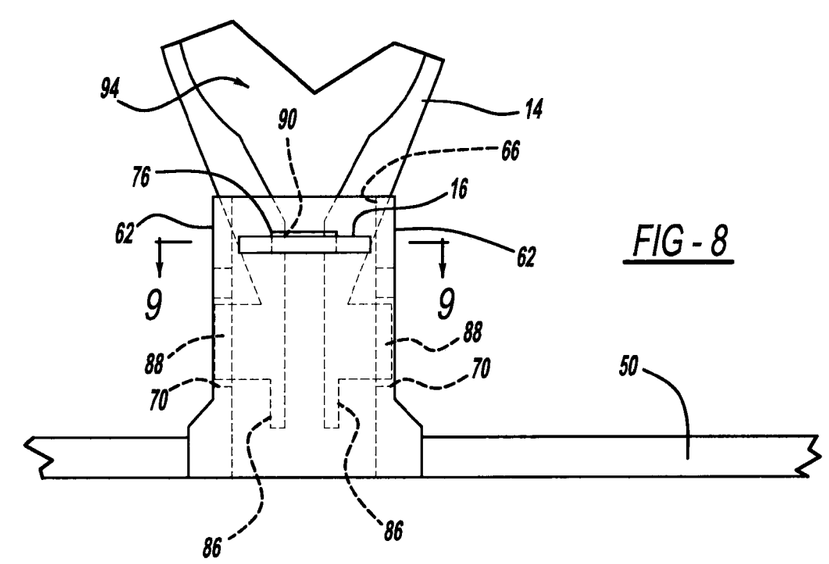
FIG. 8 is a detailed view of the pin located into the opening of the housing of the strap member in a locked position thereby capturing the distal insertion end of the loop retainer into the housing of the strap member.
Figure 9:
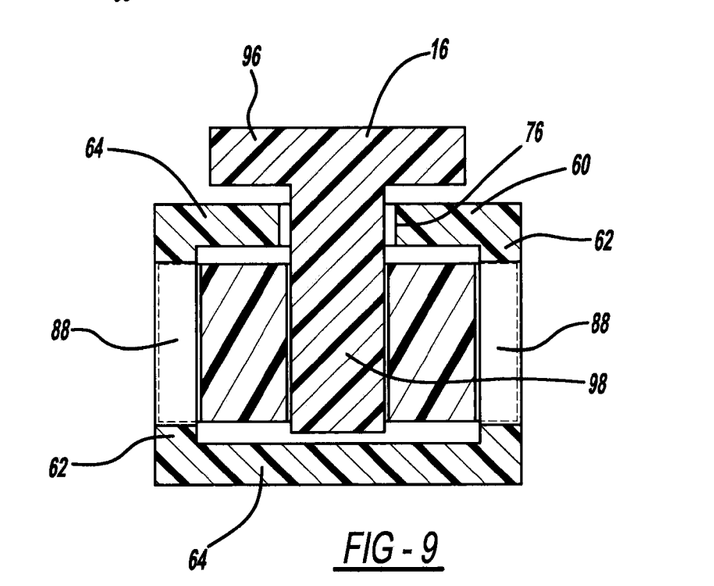
FIG. 9 is a cross-sectional view taken along line 9-9 of FIG. 8.

With reference now to FIGS. 5-7, an exemplary method of moving the loop retainer and strap member from an uninstalled position to an installed position will be described in greater detail. At the outset, the distal insertion end 82 of the loop retainer 14 can be generally aligned for receipt by the receiving portion 66 of the housing portion 60. It will be appreciated that during application, a first and second portion 102 and 104 of the wire harness service loop 20 can be located through the respective first loop portion 92 and second loop portion 94 of the loop retainer 14 (FIG. 1). Next, the ends 84 of the body 80 can be pressed toward each other as shown in FIG. 6. Notably, the detents 88 are moved to a position suitable for receipt between the first walls 62 of the housing portion 60. Next, the distal insertion end 82 can be further advanced into the receiving portion 66 to the position shown in FIG. 7. Notably, as a pinching pressure is removed from the body 80 of the loop retainer 14, the detents 88 rebound due to the elasticity of the loop retainer 14 into the respective apertures 70 defined in the first walls 62. Once the detents 88 are received by the apertures 70, the pin 16 can be inserted into the opening 76 of the housing portion 60 and be further advanced to a location at the indent 90. Notably, with the pin 16 received by the indent 90, the detents 88 are inhibited from moving toward each other and freeing themselves from the apertures 70.

Returning now to FIGS. 1 and 2, the strap member 12 is shown looped around one of the wire harnesses 42. It will be appreciated however, that the strap member 12 can be secured to other wire harnesses, connectors, or other structures of, or near the body control module 22. In general, the strap member 12 can be initially secured such as to a component of the body control module 22 and with the housing portion 60 extending in an orientation suitable for receipt of the distal insertion end 82 of the loop retainer 14. Once the strap member 12 is suitably secured, the strap member 12 can remain secured even when the body control module 22 is in the service location (FIG. 2). With the body control module 22 in the service location as shown in FIG. 2, the pin 16 can be withdrawn from the opening 76 and the loop retainer 14 removed from the service loop 20. In this regard, the extra slack provided by the service loop 20 can be used to move the body control module panel 24 to a location where it may be easily serviced. Once service has been completed, the body control module panel 24 can be returned to the body control module base 26. The loop retainer 14 can be located around the first and second portions 102 and 104 of the service loop 20 and the distal insertion end of the loop retainer 14 can be advanced into the receiving portion 66 until the detents 88 are received by the apertures 70 and the pin 16 is inserted into the opening 76 (FIG. 1). In this regard, the wire harness retainer assembly 10 provides a simple and convenient way to capture the length of the wire harness service loop 20 while providing an easily removable connection when service to the body control module 22 is desired. Moreover, the robust nature of the loop retainer 14 and interface of the distal insertion end 82 with the housing portion 60 provides a simple and repeatable connection for the operator.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A wire harness retainer assembly comprising:
   a strap member having a flexible insertion portion, a housing portion and a lock portion, wherein the insertion portion is configured to cooperate with the lock portion as the insertion portion is inserted into the lock portion to form a loop, the lock portion being progressively locked to the insertion portion as the insertion portion is pushed into the lock portion to thereby tighten the loop and inhibit withdrawal of the insertion portion from the lock portion, the housing portion comprising a housing body that defines a receiving portion and a pair of apertures formed therethrough;

a loop retainer having a body including a distal insertion end and a proximal retaining end, wherein the body forms a first loop portion that is configured to loop around a first portion of the wire harness, the body further comprising a pair of detents formed at the distal insertion end; and wherein the distal insertion end of the loop retainer is configured to be slidably inserted into the receiving portion of the housing portion to an installed position wherein the detents are at least partially received by the pair of apertures.

2. The wire harness retainer assembly of claim 1 wherein the body of the loop retainer forms a second loop, distinct from the first loop configured to loop around a second portion of the wire harness.

3. The wire harness retainer assembly of claim 2 wherein the loop retainer body is unitary.

4. The wire harness retainer assembly of claim 1 wherein the housing body comprises a first pair of opposing walls and a second pair of opposing walls formed opposite the first pair of opposing walls.

5. The wire harness retainer assembly of claim 4 wherein the first pair of opposing walls define a pair of corresponding relief portions thereon, wherein the relief portions accommodate portions of the body of the loop retainer in the installed position.

6. The wire harness retainer assembly of claim 1, further comprising a pin that is configured to engage the loop retainer and inhibit the loop retainer from withdrawing from the receiving portion of the housing portion in a locked position.

7. The wire harness retainer assembly of claim 6 wherein the housing body defines an opening for receiving a first portion of the pin.

8. A wire harness retainer assembly comprising:

a strap member having an insertion portion, a housing portion and a lock portion, wherein the insertion portion is configured to be inserted into the lock portion to form a loop, the housing portion comprising a housing body that defines a receiving portion and a pair of apertures formed therethrough;

a loop retainer having a body including a distal insertion end and a proximal retaining end, wherein the body forms a first loop portion that is configured to loop around a first portion of the wire harness, the body further comprising a pair of detents formed at the distal insertion end;

wherein the distal insertion end of the loop retainer is configured to be slidably inserted into the receiving portion of the housing portion to an installed position wherein the detents are at least partially received by the pair of apertures; and a pin that is configured to engage the loop retainer and inhibit the loop retainer from withdrawing from the receiving portion of the housing portion in a locked position;

wherein the housing body defines an opening for receiving a first portion of the pin; and wherein the body of the loop retainer defines a pair of opposing indents configured to collectively receive a second portion of the pin, wherein the pin inhibits the detents from moving toward each other in the locked position.

9. The wire harness retainer assembly of claim 8 wherein the pin comprises a gripping portion and an insertion portion, wherein the insertion portion comprises the first and second portions of the pin.

10. A wire harness retainer assembly comprising:

a strap member having an insertion portion, a housing portion and a lock portion, wherein the insertion portion is configured to be inserted into the lock portion to form a loop, the housing portion comprising a housing body that defines a receiving portion, an opening and a pair of apertures formed therethrough;

a dual-loop retainer having a body including a first end and a second end that collectively form a distal insertion end, the dual-loop retainer further including a proximal retaining end, including a first loop portion that is configured to loop around a first portion of the wire harness and a second loop portion that is configured to loop around a second portion of the wire harness, the body further comprising a pair of detents formed at the distal insertion end, wherein the distal insertion end of the loop retainer is configured to be slidably inserted into the receiving portion of the housing portion to an installed position wherein the detents are at least partially received by the pair of apertures; and a pin configured for receipt into the opening of the housing body to a locked position between corresponding first and second ends of the distal insertion end, wherein the pin inhibits the detents from moving toward each other in the locked position.

11. The wire harness retainer assembly of claim 10 wherein the dual-loop retainer body is unitary.

12. The wire harness retainer assembly of claim 10 wherein the housing body comprises a first pair of opposing walls and a second pair of opposing walls formed opposite the first pair of opposing walls.

13. The wire harness retainer assembly of claim 12 wherein the first pair of opposing walls define a pair of corresponding relief portions thereon, wherein the relief portions accommodate portions of the body of the loop retainer in the installed position.

14. The wire harness retainer assembly of claim 10 wherein the body of the loop retainer defines a pair of opposing indents configured to collectively receive a second portion of the pin, wherein the pin inhibits the detents from moving toward each other in the installed position.

15. The wire harness retainer assembly of claim 14 wherein the pin comprises a gripping portion and an insertion portion, wherein the insertion portion comprises the first and second portions of the pin.

16. A method of securing a wire harness, the method comprising:

securing a strap member relative to a component of a control module;

locating a first portion of the wire harness into a first loop portion of a loop retainer;

locating a second portion of the wire harness into a second loop portion of the loop retainer, wherein the second loop portion is distinct from the first loop portion;

inserting a distal insertion end of the loop retainer into a housing formed on the strap member;

further inserting the distal insertion end until a pair of detents extending from the loop retainer locates into corresponding apertures defined in the housing to an installed position;

advancing a pin into an opening defined in the housing; and further advancing the pin to a locked position between corresponding first and second ends of the loop retainer wherein the detents are inhibited from moving toward each other.

17. The method of claim 16 wherein advancing the pin comprises slidably locating the pin into corresponding indents formed on the first and second ends of the loop retainer.

18. The method of claim 16 wherein inserting the distal insertion end comprises locating portions of the loop retainer through corresponding relief portions formed into the housing.

19. The method of claim 16 further comprising:

removing the pin from the housing;

withdrawing the distal insertion end of the loop retainer from the housing;

freeing the wire harness from the loop retainer;

moving the body control module from a working position to a service position; and servicing the body control module.

20. The method claim 19 further comprising, subsequent to the servicing of the body control module, returning the body control module to the working position, locating the loop retainer back to the installed position and advancing the pin to the locked position.

21. The wire harness retainer assembly of claim 7 wherein the body of the loop retainer defines a pair of opposing indents configured to collectively receive a second portion of the pin, wherein the pin inhibits the detents from moving toward each other in the locked position.

22. The wire harness retainer assembly of claim 21 wherein the pin comprises a gripping portion and an insertion portion, wherein the insertion portion comprises the first and second portions of the pin.

* * * * *